No. 755,196. PATENTED MAR. 22, 1904.
F. L. O. WADSWORTH.
ILLUMINATING STRUCTURE.
APPLICATION FILED OCT. 28, 1898.
NO MODEL. 2 SHEETS—SHEET 1.

Witnesses
Inventor
Frank L. O. Wadsworth
by Foster Freeman
Attorneys

No. 755,196. PATENTED MAR. 22, 1904.
F. L. O. WADSWORTH.
ILLUMINATING STRUCTURE.
APPLICATION FILED OCT. 28, 1898.
NO MODEL. 2 SHEETS—SHEET 2.

Witnesses
J. G. Hinkel
Harry E. Hay.

Inventor
F. L. O. Wadsworth
by Foster Freeman
Attorneys

THE NORRIS PETERS CO., PHOTO-LITHO., WASHINGTON, D. C.

No. 755,196.

Patented March 22, 1904.

UNITED STATES PATENT OFFICE.

FRANK L. O. WADSWORTH, OF WILLIAMS BAY, WISCONSIN, ASSIGNOR TO PRESSED PRISM PLATE GLASS COMPANY, A CORPORATION OF WEST VIRGINIA.

ILLUMINATING STRUCTURE.

SPECIFICATION forming part of Letters Patent No. 755,196, dated March 22, 1904.

Application filed October 28, 1898. Serial No. 694,830. (No model.)

*To all whom it may concern:*

Be it known that I, FRANK L. O. WADSWORTH, a citizen of the United States, residing at Williams Bay, in the county of Walworth and State of Wisconsin, have invented certain new and useful Improvements in Illuminating Structures, of which the following is a specification.

The object of my invention is an illuminating structure of simple and easily-made construction which has a wide range of application to various situations in which such structures are used and, further, one in which by a simple adjustment of the parts of the structure the illuminating effect produced in the space behind such structures may be varied.

Figure 1:
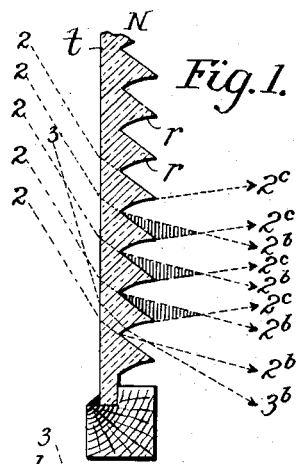
Figure 2:
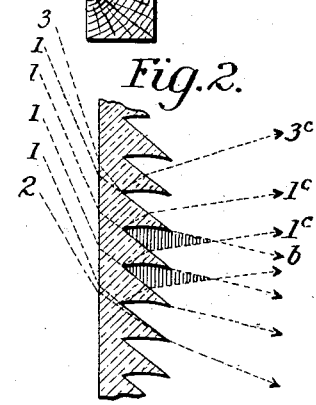
Figure 3:
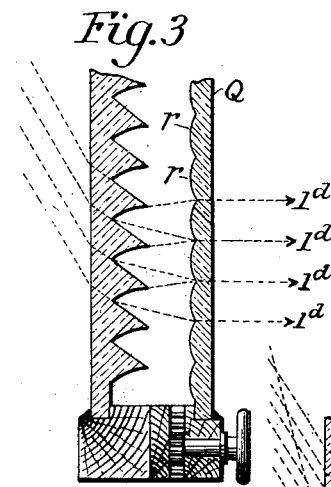
Figure 4:
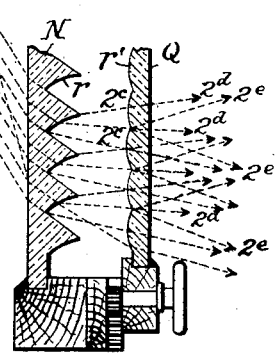
Figure 5:
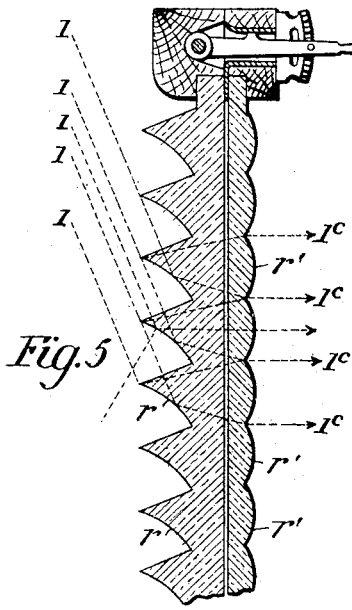
Figure 6:
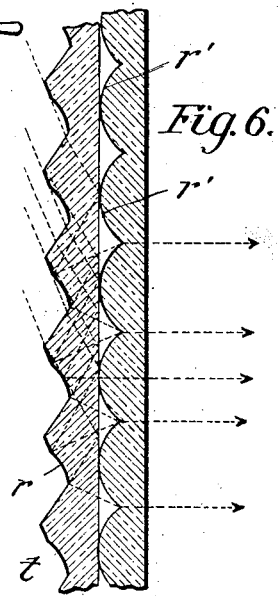
Figure 7:
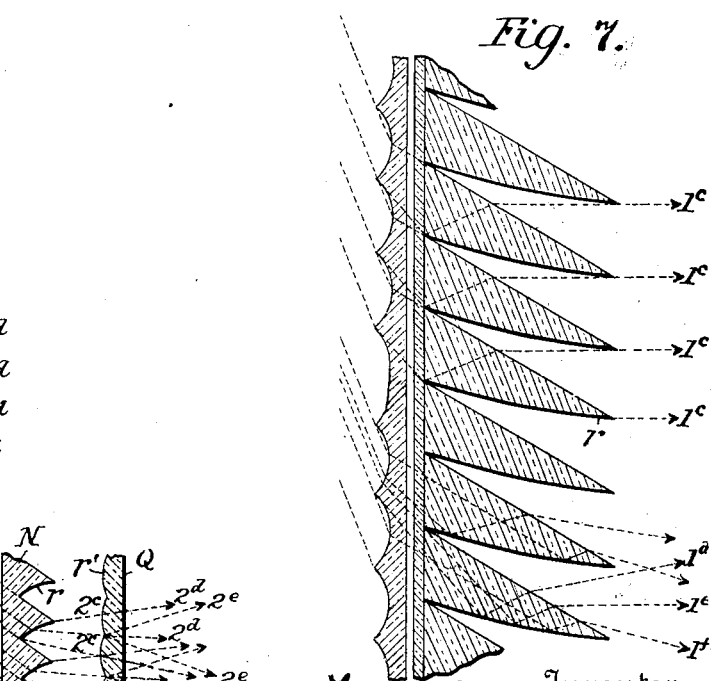
Figure 6:
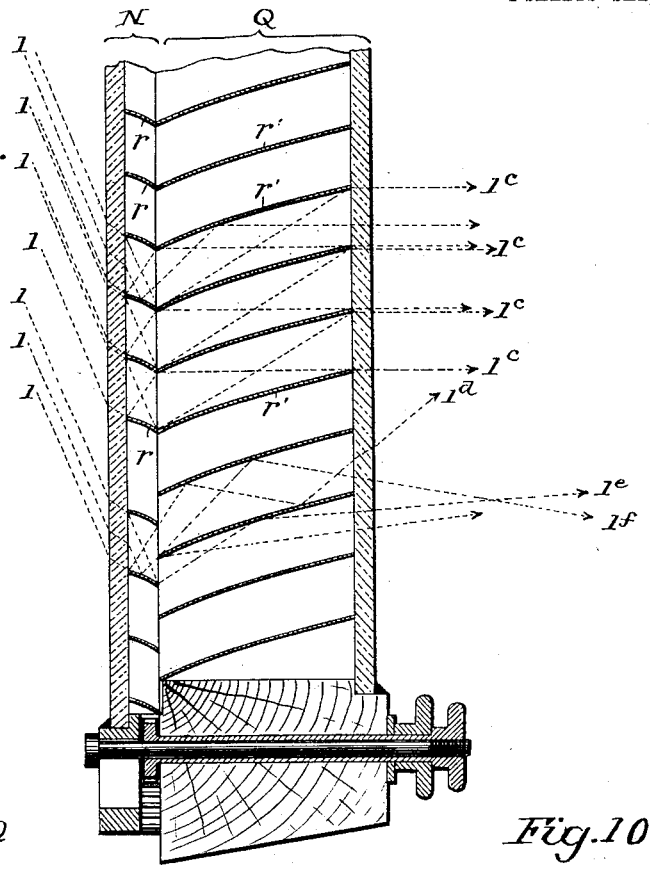

Referring to the accompanying drawings, Figures 1 and 2 are part-sectional views illustrating my improved form of structure; Figs. 3 and 4, cross-sectional views of such structure with additional features under different conditions of adjustment; Figs. 5, 6, and 7, various modifications embodying my invention; Fig. 8, a different form of reflecting illuminating structure embodying my improvements, and Figs. 9 and 10 modifications embodying my invention in which both reflecting and refracting plates are used.

By my invention I avoid the difficulties heretofore experienced and obtain at the same time other advantages by the use of such surfaces on the deflecting elements of the illuminating-plates (either at the incidence or emergence side) as will spread the beams of light issuing from the elements instead of discharging them in parallel lines or in converging lines, as heretofore, and this I effect by providing a series of separated curved deflecting-faces so arranged in any suitable manner as to diverge the light-rays passing therefrom. This result may be attained by using curved faces in various different arrangements, as will now be pointed out.

When these structures are refracting in character, as in Fig. 1, the deflecting emergent faces $r\ r$ of the prism elements are on the emergent side and are concave in transverse cross-section, under which circumstances the parallel rays of light 2 2 falling on such faces are directed downward, as at $2^b$, where they fall on parts of the face more nearly parallel to the front or entrance face $t$ and upward, as at $2^c$, where they fall on the parts inclined at a higher angle thereto. Such structures when placed in a window fulfil, therefore, all the purposes of previous structures and have the advantage over such structures in that the unilluminated part of the space back of the structure (indicated by the shaded portions) is much smaller in the case where diverging emergent surfaces are used than in the case where converging emergent surfaces are used. Such structures, moreover, have the additional great advantage that by placing in the proper position behind the first section N of the structure a second section Q, provided with a series of faces of such curvature as to effect a reconvergence of the cone of light emerging from the first structure, I may at will direct all such rays of light in parallel lines and in a continuous sheet from the inner side, as at $1^d\ 1^d$, Fig. 3. By simply placing such section Q behind the first section N or removing it I may therefore adapt the structure either to use for shallow rooms, where wide lateral divergence of the emergent streams of light is desired, or in long narrow rooms, where it is desired to direct practically all the light to the back of the apartment, and by making such section removable and inserting or removing it I am enabled under the conditions to direct the majority of the light either to the front or to the back of the apartment at will. This latter possibility of altering the amount of divergence of the issuing streams of light is still more fully carried out by making the section Q movable with respect to the section N, as in Fig. 1. When the section Q is moved so as to occupy a position in which the meeting edges of the dispersing elements $r'\ r'$ of said section are opposite the central portion of the elements $r\ r$ of the first section of the structure, the lateral divergence of the rays falling upon the section Q from the section N is increased, the rays $2^c$ $2^c$ being now partly transmitted unchanged in direction, as at $2^d$ $2^d$, and partly diverted still further, as at $2^e$ $2^e$.

Figure 9:
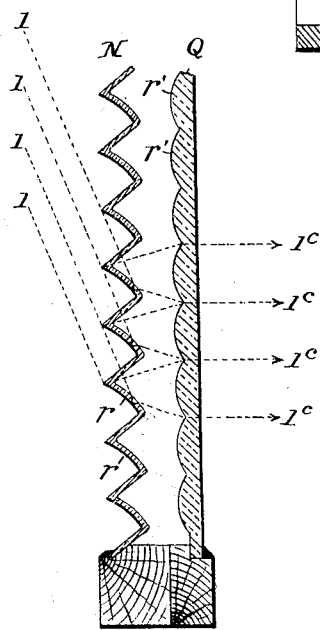

In carrying out my invention various forms of dispersing and converging plates may be used. Thus in Figs. 5 and 6 the prismatic plate has curved reflecting-faces $r$ $r$ $r$ on the entrance side, the dispersing-plate having, as before, a series of curved convex ribs $r'$ $r'$ $r'$. In Fig. 7 the diverging faces are the receiving-faces $s$ $s$ $s$ of the prism elements, the divergent beam being received upon convexly-curved reflecting-faces $r$ $r$ $r$ and directed therefrom in substantially parallel lines, as before. In Fig. 8 both sections N and Q of the structure are reflecting in character, the rays being received first on the convex reflecting-faces $r$ $r$ $r$ of the section N and directed therefrom in divergent beams upon the concavely-curved reflecting-faces $r'$ $r'$ $r'$ of the section Q, from which they are, as before, discharged in parallel streams $1^c$ $1^c$ $1^c$. In Fig. 9 the diverging faces are again reflecting-faces, being in this case the silvered sides $r$ of the corrugated section N and the section Q being of the same character as is illustrated in Figs. 5 and 6. In Fig. 7 a very similar form is shown, except that the ribs on the section Q have a prismatic action as well as the converging action of the ribs $r'$. (Shown in Figs. 5 and 6.)

Figure 10:
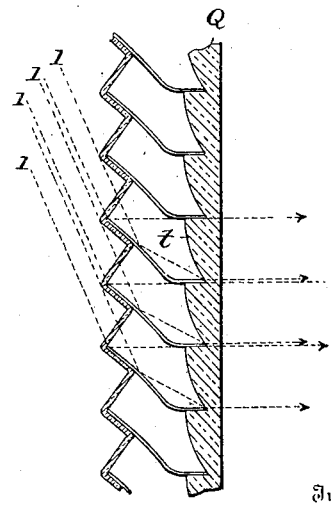

In the structures shown in Figs. 5, 6, 7, and 8 the same effect is produced by moving one section with respect to the other, as has already been described and illustrated in the case of the structure shown in Fig. 1—that is, when the first section is moved with reference to the second, or vice versa, as shown in the lower parts of Figs. 7 and 8, the beams of light instead of issuing in parallel sheets from the second plate are broken up into spreading cones, as at $1^d$ $1^e$ $1^f$, &c.

Where it is the purpose of the structure simply to discharge the light received upon it from a given direction from the inner side in a continuous sheet, it is of course unnecessary to make the two parts movable with respect to each other, and they may in such cases form part of a substantially integral construction, as shown in Fig. 10.

In all cases in order to best accomplish the object of my invention the two curved faces $r$ and $r'$ have complementary curvatures—that is, the curvature of the second is such that in its action on the rays of light falling upon it it corrects when in proper position the divergence given to these rays by the first surface.

In most cases a sufficiently close approximation to this effect is arrived at by the use of circle arcs; but when the highest perfection of result is desired parabolic curvatures may be used for those faces which are reflecting in character and hyperbolic surfaces for those which refract the rays falling upon them.

I do not here claim, broadly, an illuminator having two light-deflecting sections one adjustable in respect to the other, as this is the subject of a separate application, Serial No. 694,828.

Without limiting myself to the constructions and arrangements shown, I claim—

1. An illuminating structure, one face of which has a series of straight parallel prismatic elements, one face of each prism being flat throughout its length and the other face concave throughout its length whereby the light-rays passing therefrom are distributed uniformly back of the structure, substantially as set forth.

2. An illuminating structure in two sections, one having straight prisms each with a curved deflecting-face which acts to diverge the rays of light falling thereon, and the other with a series of curved faces which act conversely to converge the rays of light falling thereon, substantially as set forth.

3. An illuminating structure for the transmission of light, having two sections, one having a series of separated curved deflecting-faces, and the other also with a series of curved faces, the curvatures of the two series of faces being complementary, whereby the divergence of the rays of light by the first set of surfaces is just compensated by the convergent action of the second set of surfaces, substantially as and for the purpose described.

4. The combination in an illuminating structure, of a section having separated curved deflecting-faces, and a second section having a series of curved faces, with means for adjusting one section in respect to the other, substantially as set forth.

In testimony whereof I have signed my name to this specification in the presence of two subscribing witnesses.

FRANK L. O. WADSWORTH.

Witnesses:
E. G. FERGUSON,
H. E. CARMACK.